United States Patent [19]

Hirayama

[11] Patent Number: 5,424,966
[45] Date of Patent: Jun. 13, 1995

[54] CALCULATING APPARATUS
[75] Inventor: Tomoshi Hirayama, Tokyo, Japan
[73] Assignee: Sony Corporation, Tokyo, Japan
[21] Appl. No.: 250,352
[22] Filed: May 27, 1994

Related U.S. Application Data

[63] Continuation of Ser. No. 20,909, Feb. 22, 1993, abandoned, which is a continuation of Ser. No. 677,118, Mar. 29, 1991, abandoned.

[30] Foreign Application Priority Data

Mar. 29, 1990 [JP] Japan .................................. 2-81703

[51] Int. Cl.⁶ .............................................. G06F 3/00
[52] U.S. Cl. ........................ 364/709.16; 364/709.01; 364/709.11
[58] Field of Search ............... 364/709.01, 709.06, 364/709.07, 709.08, 709.09, 709.11, 709.16

[56] References Cited

U.S. PATENT DOCUMENTS 4,099,246  7/1978  Osborne et al. ................ 364/709.16
5,199,104  3/1993  Hirayama ........................ 395/145

OTHER PUBLICATIONS

Macintosh System Software User's Guide, Version 6.0 Published in 1988, and the screen printout from a Macintosh system software in operation with a calculator invoked.

Primary Examiner—Paul P. Gordon
Assistant Examiner—Chuong D. Ngo
Attorney, Agent, or Firm—Hill, Steadman & Simpson

[57] ABSTRACT

A calculating apparatus having numeral keys, operation keys, a decimal point key and an input information display portion. In this calculating apparatus, when a series of numerical values are input by the respective keys, the decimal point key is controlled so that the decimal point key is in a selection disabled condition after the decimal point key is depressed once. Therefore, the user can know the inoperable condition of the decimal point key and can be protected from misoperating the keys.

1 Claim, 14 Drawing Sheets

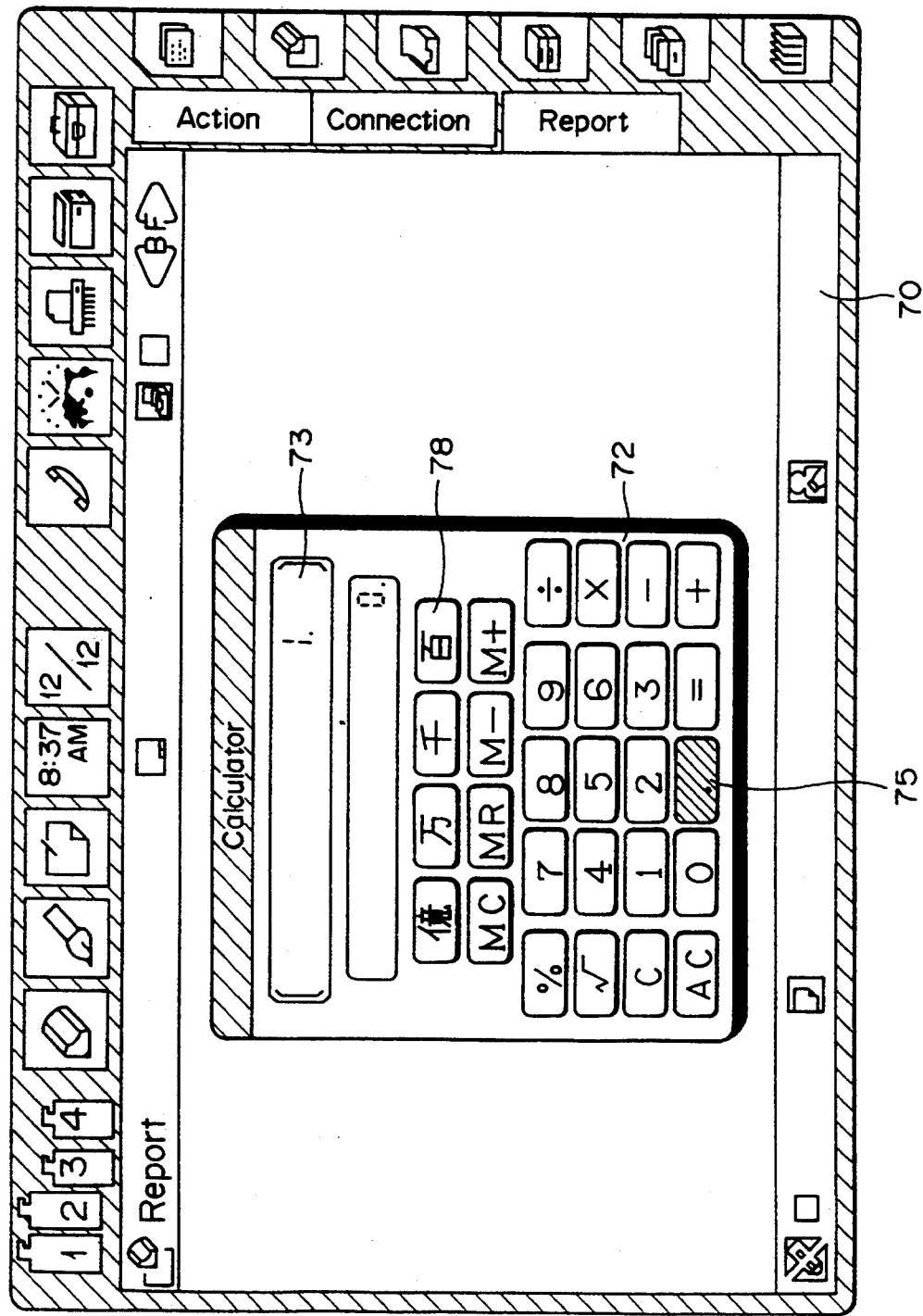

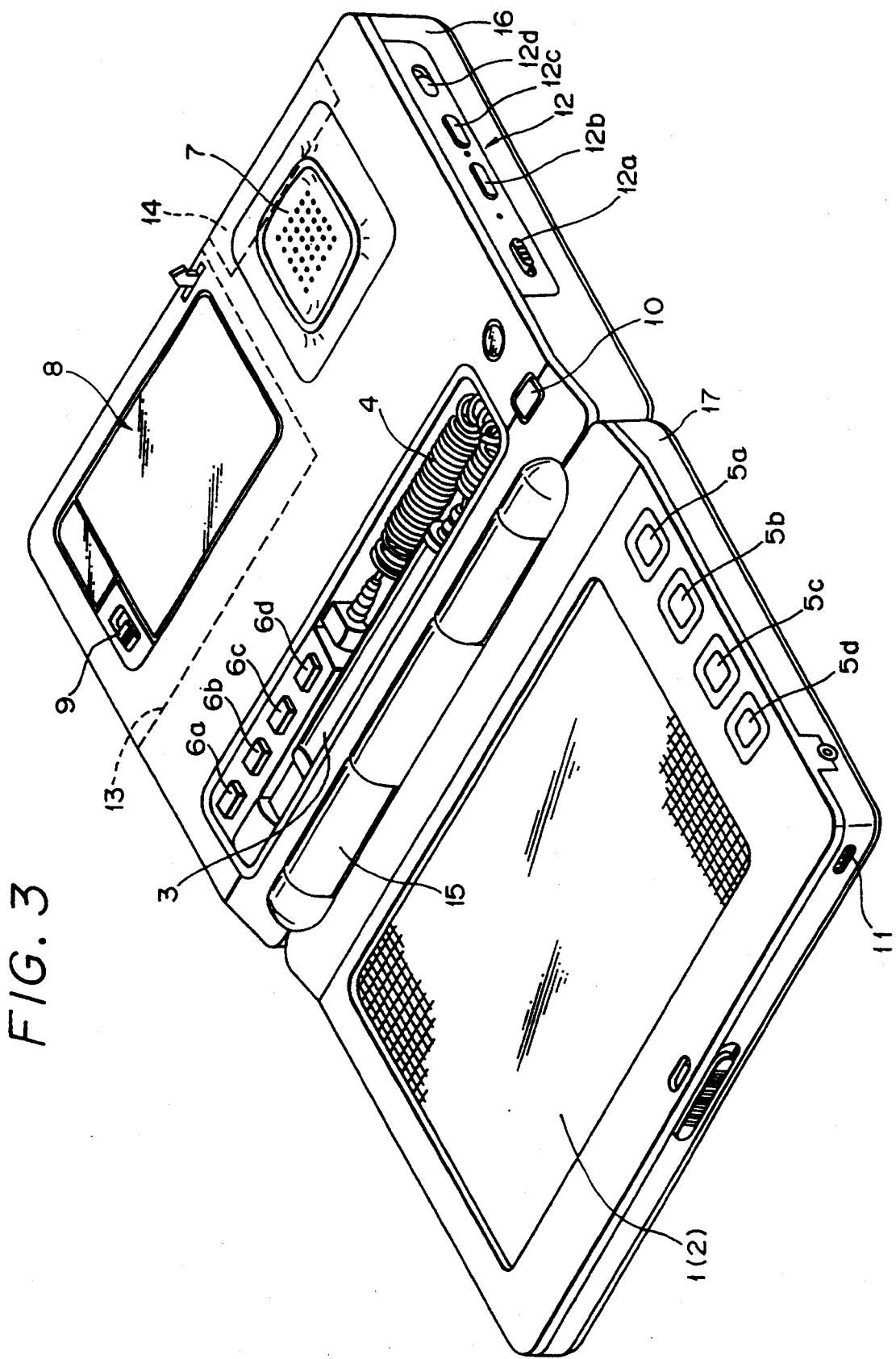

CALCULATING APPARATUS

This is a continuation of application Ser. No. 08/020,909 filed Feb. 22, 1993 now abandoned, which is a continuation, of application Ser. No. 677,118, filed Mar. 29, 1991 now abandoned.

FIELD OF THE INVENTION

The present invention generally relates to calculating apparatus and, more particularly, is directed to a calculating apparatus for use with a display device in which a calculating apparatus is electronically displayed.

DESCRIPTION OF THE PRIOR ART

In a conventional calculating apparatus having operation keys such as a decimal point key, numerical keys, operator keys or the like and an input information display unit, when a calculation such as the four rules of arithmetic is carried out, if a series of numerals are input, for example, if numerical keys involving a decimal point are depressed as [1.2], a decimal point input after the second input is automatically removed by the internal processing because the decimal point is used only once in a series of numerals.

As described above in the prior art, if the decimal point is input once, the internal electronic circuit automatically omits the next decimal point and displays no such succeeding decimal point. However, a key which enables the decimal point to be input is made operable in actual practice and the user may push this decimal point key. Therefore, it is frequently observed that the user pushes such decimal point key a plurality of times unintentionally. Generally, in the conventional calculating apparatus, if the decimal point key is depressed twice, then an alarm sound will be emanated to inform the user of the mis-operation of the decimal point key. This alarm sound system is not so effective because the user always notices the mistake after the occurrence of mis-operation.

OBJECTS AND SUMMARY OF THE INVENTION

Accordingly, it is an object of the present invention to provide an improved calculating apparatus in which the aforenoted shortcomings and disadvantages of the prior art can be eliminated.

More specifically, it is an object of the present invention to provide a calculating apparatus in which the user can be protected from mis-operating the key.

According to an aspect of the present invention, a calculating apparatus has numeral keys, operation keys, a decimal point key and an input information display portion. In this calculating apparatus, when a series of numerical values are input by the respective keys, the decimal point key is controlled so that the decimal point key is in a selection disabled condition after the decimal point key is depressed once. Therefore, the user can know the inoperable condition of the decimal point key and can be protected from operating unnecessary keys.

The above, and other objects, features and advantages of the present invention will become apparent in the following detailed description of a preferred embodiment to be taken in conjunction with the accompanying drawings, in which like reference numerals are used to identify the same or similar parts in the several views.

BRIEF DESCRIPTION OF THE DRAWINGS

FIGS. 2A through 2K are schematic diagrams, respectively, showing examples of picture screens of a portable computer to which the present invention can be applied, and to which references will be made in explaining operation of the present invention;

FIG. 3 is a perspective view of an appearance of the portable computer to which the present invention is applied.

DETAILED DESCRIPTION OF THE PREFERRED EMBODIMENT

Figure 1:
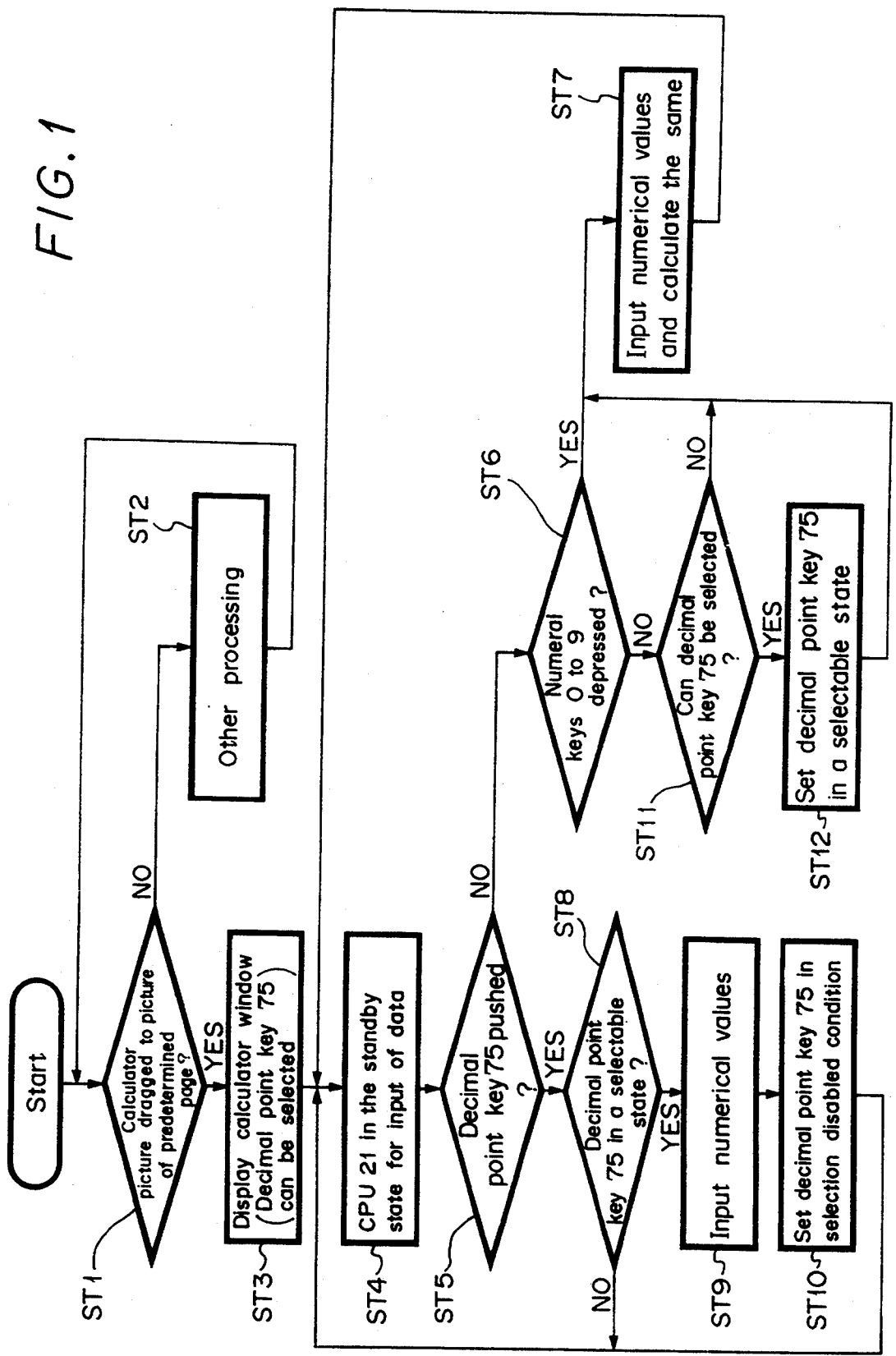
FIG. 1 is a flowchart to which references will be made in explaining operation of an embodiment of the present invention.

An embodiment of a calculating apparatus according to the present invention will hereinafter be described with reference to the accompanying drawings. In this embodiment, the calculating apparatus of the present invention is applied to a portable computer, and prior to describing the present invention with reference to FIG. 1 and FIGS. 2A to 2K, an overall arrangement of the present invention will be described with reference to FIGS. 3 and 4.

Referring to FIG. 3, a display device, i.e., a display unit 1 formed of a liquid crystal display (LCD) device or the like is provided on a left housing 17. The display unit 1 display on a picture screen thereof video data from a central processing unit (CPU) or the like which will be described later, and an input apparatus, that is, an input tablet 2 formed of a so-called touch sensitive device or the like is attached to the surface of the display unit 1. A pen 3 is used to input arbitrary data or the like in cooperation with the input tablet 2, and the pen 3 and the input table 2 have detecting means for sensing the change of electrostatic capacitance between the pen 3 and the input tablet 2. Therefore, even when the point of the pen 3 is not in contact with the input tablet 2, coordinate position can be detected and a cursor also is displayed on the display unit 1 at its position opposing to the point of the pen 3.

When the user picks up the pen 3 and touches the input tablet 2 with the point of the pen 3, informations such as contact condition, contact position or the like are supplied through a cord 4 or the like to the CPU, thereby arbitrary data and others being input to the CPU. Further, reference numerals 5a, 5b, 5c, 5d and 6a, 6b, 6c and 6d designate key switches and signals therefrom are also supplied to the CPU.

Reference numeral 7 designates a speaker unit and 8 a battery accommodating section in which a power source battery is accommodated in the inside of a lid which is made openable and/or closable by releasing a lock mechanism 9. Further, reference numeral 10 designates a power switch and 11 a microphone. Furthermore, reference numeral 12 designates an operation key pad for performing a solid state recording which will be described later. This operation key pad 12 is composed of a recording key 12a, a playback key 12b, a stop key 12c and a sound level adjusting key 12d which can adjust the level of sound in high, medium and low. When these keys 12a through 12d are pushed and slid, an audio signal fed to the microphone 11 is recorded and the recorded sound is emanated from the above-mentioned speaker 7. Further, a dashed line block 13 designates a socket into which an IC card such as a read only memory (ROM), a random access memory (RAM) and so on is inserted, and a dashed line block 14 designates an expansional socket which is used to connect this portable computer to external apparatus or the like. This expansional socket 14 is provided at the side wall of a right housing 16.

Furthermore, reference numeral 15 denotes a hinge which incorporates therein a flexible board through which a signal is transmitted. By this hinge 15, this portable computer can be folded into two parts without being affected by an electrical interference or the like. In use, this portable computer is about 20 cm long and about 20.5 cm wide in the unfolded state, and is about 4 cm thick in the folded state. The display unit 1 is about 15 cm long and 10 cm wide.

Figure 4:
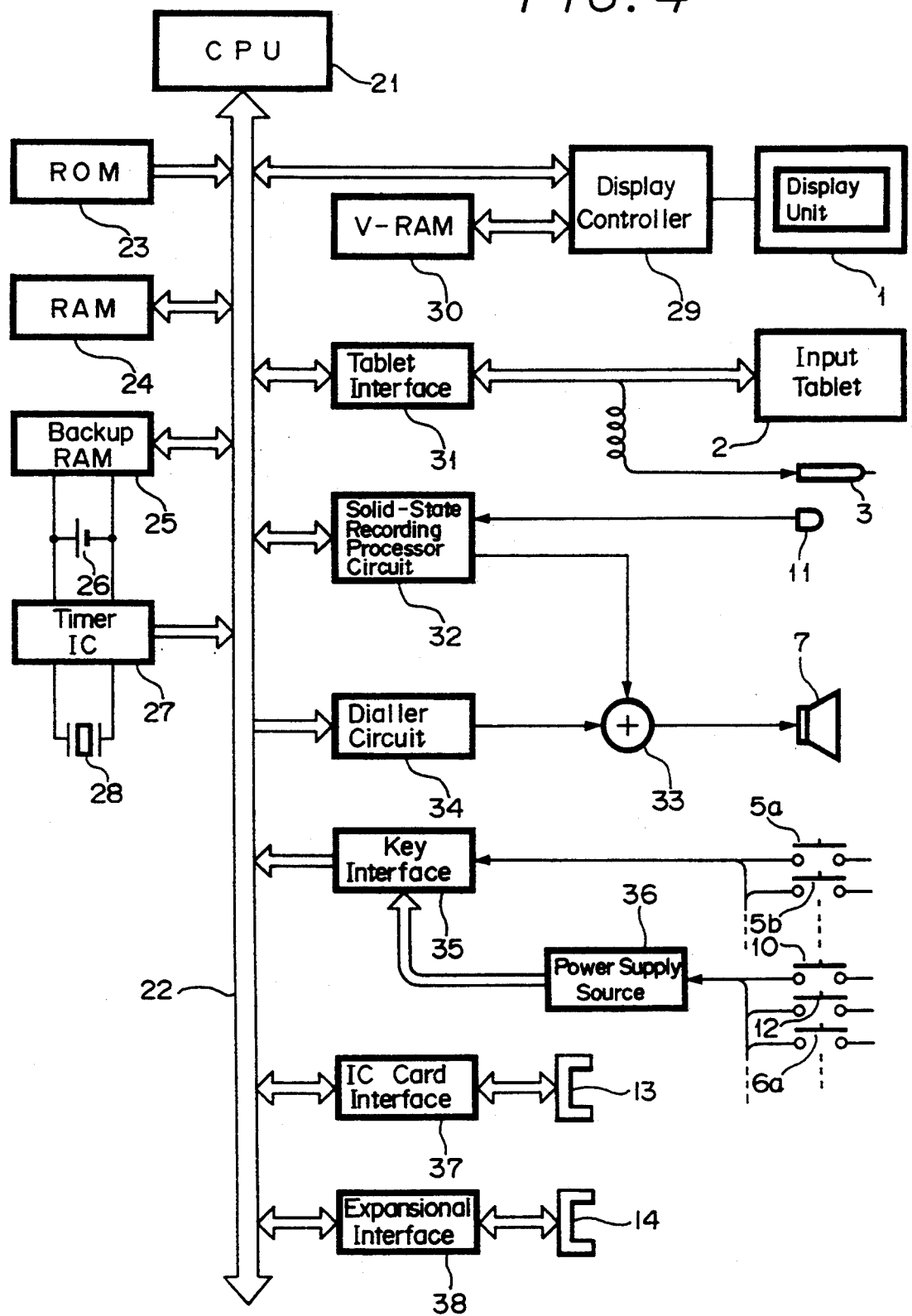
FIG. 4 is a block diagram showing an overall arrangement of the present invention.

In this portable computer, the housed hardware is constructed as shown in FIG. 4.

As shown in FIG. 4, there is provided a CPU 21 to which various function ICs and so on are connected through a bus line 22. A ROM 23 is connected through the bus line 22 to the CPU 21, and, in addition to a system program for controlling the entirety of this portable computer, a Kana-Kanji conversion program for word processing function for Japanese language, dictionary data therefor, hand-written input information recognition program, dictionary data and so on are written in the ROM 23.

Reference numeral 24 designates a RAM for work area and 25 a backup RAM to which a power supply source 26 is connected.

Further, reference numeral 27 designates a timer IC. This timer IC 27 is driven by the power supply source 26 and counts clocks generated from a quartz oscillator 28 to constantly output data of year, month, day and time.

A connection relation between the above-mentioned hardware and respective sections in the perspective view of FIG. 3 will be described with reference to FIG. 4.

Referring to FIG. 4, a display controller 29 is provided to control the display unit 1. This display controller 29 is controlled by the CPU 21, and display data made by the CPU 21 is written in a V-RAM (video-RAM) 30 through the display controller 29. The data written in the V-RAM 30 is supplied through the display controller 29 to the display unit 1.

A tablet interface 31 is provided for the input tablet 2 integrally formed with the display unit 1 and the pen 3, and by way of the tablet interface 31, data or the like written in the input tablet 2 is supplied to the CPU 21.

A solid state recording processing circuit 32 is provided to process the audio signal from the microphone 11 in the predetermined manner such as an analog-to-digital (A/D) conversion or the like. The thus processed signal is stored in the backup RAM 25 through the CPU 21, and audio signal data stored in the backup RAM 25 is supplied to the solid state recording processing circuit 32, in which it is processed in a predetermined manner such as a digital-to-analog (D/A) conversion or the like, the thus processed signal being fed through a mixer 33 to the speaker 7.

Further, reference numeral 34 designates a dialler circuit which generates, when supplied with arbitrary data such as a phone number or the like from the CPU 21, an acoustic signal corresponding to a dual tone signal such as a phone number or the like of a so-called push button phone. This signal is supplied through a mixer 33 to the speaker 7.

A key interface circuit 35 is adapted to receive directly or through a power supply source circuit 36 signals from the abovementioned key switches 5a to 5d, 6a to 6d, the power switch 10, the key pad 12 o the like. From the key interface circuit 35, a signal converted in a predetermined manner is supplied to the CPU 21. Incidentally, the power switch 10, the key switches 6a to 6d and the key pad 12 except the stop key 12d are connected through the power supply source circuit 36 to the key interface circuit 35. When these key switches are operated, the power supply source circuit 26 is initially activated and then key operation informations are supplied to the key interface circuit 35.

An IC card interface circuit 37 and an expansional interface circuit 38 are interconnected to the bus line 22 and the sockets 13 and 14, respectively.

In the above-mentioned portable computer, the processing for reading data out of the V-RAM 30 and for performing a calculation by the CPU 21 will be described below.

Figure 2A:
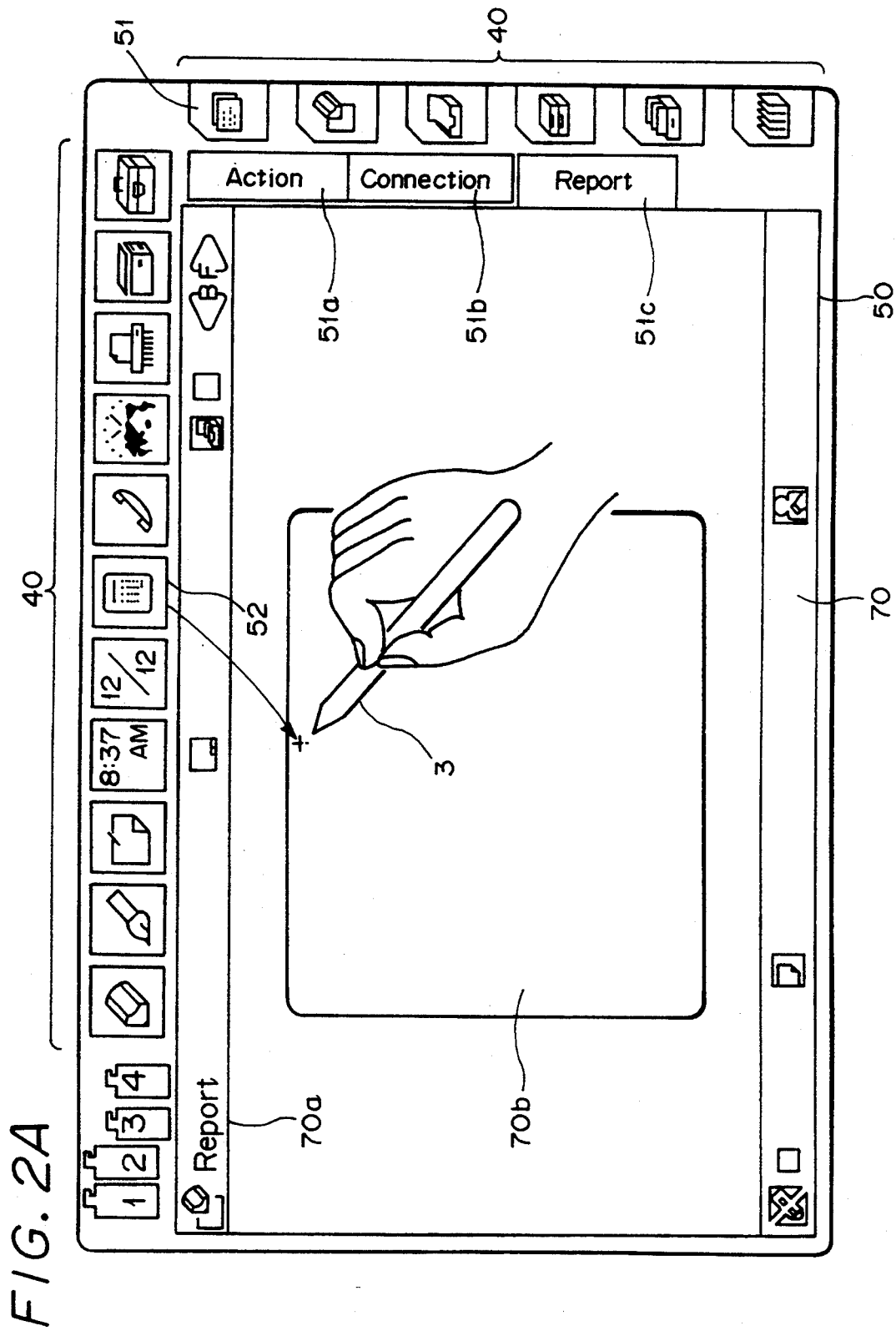

Initially, when the power switch 10 on the right housing 16 of the portable computer shown in the perspective view of FIG. 3 is depressed, an icon (icon is a picture used instead of a character on the menu of the CRT picture screen) group 40 is displayed on an area 50 shown by a hatched area in FIG. 2A.

As a REPORT picture 70 shown in FIG. 2A, there is displayed the latest page.

Operation of this embodiment will be described hereinafter with reference to FIG. 1 and FIGS. 2A to 2K.

Initially, as shown in FIG. 2A, [calculator] icon 52 arranged on the upper side of the REPORT picture 70 is touched with the point of the pen 3 as shown in FIG. 2A. If the pen 3 is further dragged to an active area (area beyond a line 70a of FIG. 2A), icon 52 is enlarged as shown by a picture frame 70b. The CPU 21 constantly determines in decision step ST1 of FIG. 1 whether or not a calculator picture (hereinafter referred to as a calculator window) is dragged to the REPORT picture 70 of the predetermined page. If the calculator window is not dragged to the page as represented by a NO at step ST1, then other processing is executed as shown at step ST2 and a loop for returning to the first step ST1 is formed. If a YES is output at step ST1, the processing proceeds to step ST3, whereat the above-mentioned calculator window 72 is displayed on the REPORT picture 70 at the position in which the point of the pen 3 is released as shown in FIG. 2B.

Figure 2B:
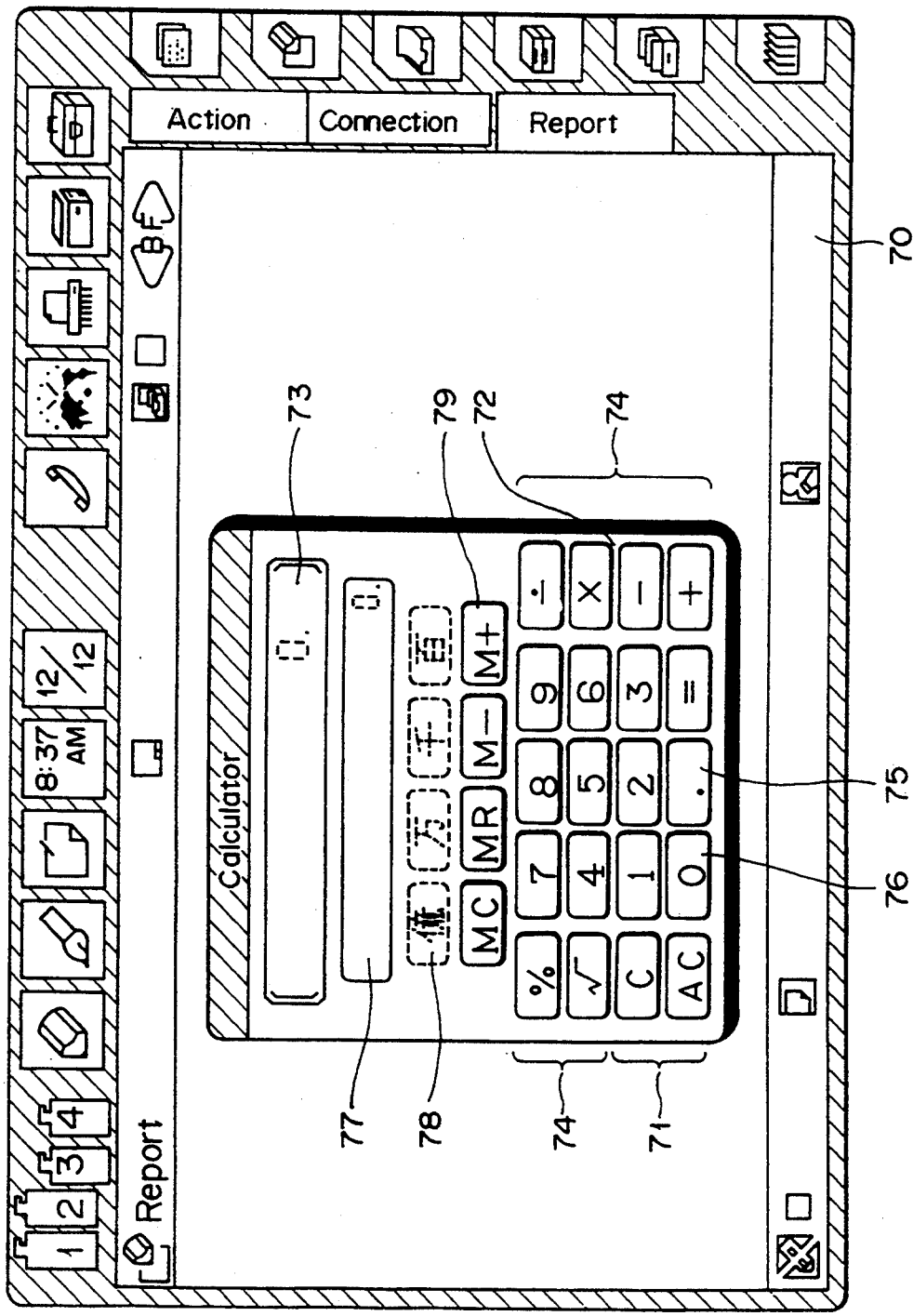

As shown in FIG. 2B, in this calculator window 72, there are displayed an input information display portion 73, a memory input portion 77 which displays thereon contents of memory, a figure determining input key pad 78 which determines     (hundred million),    (ten thousand),    (thousand) and    (hundred), a numerical key pad 76 which is used to input numerals from 0 to 9, a decimal point key 75 which is used to input a decimal point, operation keys 74 which are used to execute calculations such as ÷, ×, −, +, %, ° , = and so on and a cancel key pad 71. At the time when such calculator window 72 is displayed, the display portions 73 and 77 display thereon [0.]. Under this condition, since there is no risk that the figure determining input key pad 78 such as  ,  ,    and    are never pushed, the figure determining key pad 78 is represented by a half tone mesh so that the user can visually confirm that the key pad 78 is disabled. In that case, the decimal point key 75 on the calculator window 72 initially appeared on the REPORT picture 72 can be selected (at step ST3).

In the next step ST4, the CPU 21 is in the standby state for awaiting that the any one of the keys in the calculator window 72 is touched with the point of the pen 3. In the next decision step ST5, the CPU 21 determines whether or not the decimal point key 75 is depressed. If the decimal point key 75 is not touched with the point Of the pen 3 as represented by a NO at step ST5, then the processing proceeds to the next decision step ST6, whereat it is determined whether or not numeral key pad 76 is depressed. In that case, if the numeral key "1" is touched with the point of the pen 3 (this will hereinafter be referred to a key depressed state) as shown, for example, by a hatched area in FIG. 2C, [1.] is displayed on the display portion 73. Under this condition, the figure determining key pad 78 and the decimal point key 75 can be selected. Then, the processing goes to step ST7 and numerical values are input and calculated. However, in this case, there are no input numbers to be calculated so that the processing returns to step ST4, thus maintaining the key depressed condition in which the key is constantly touched with the point of the pen 3.

Figure 2C:
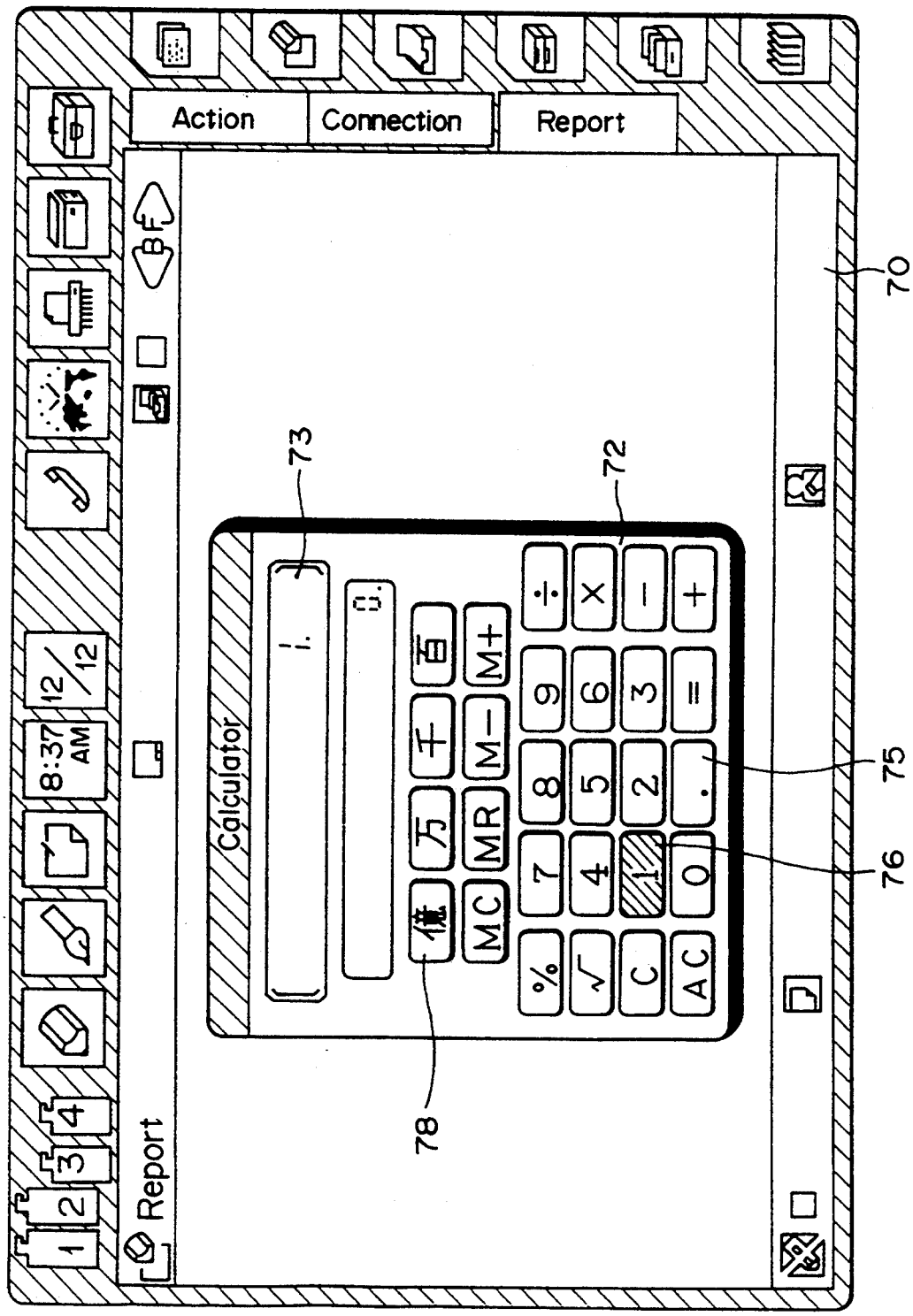
Figure 2E:
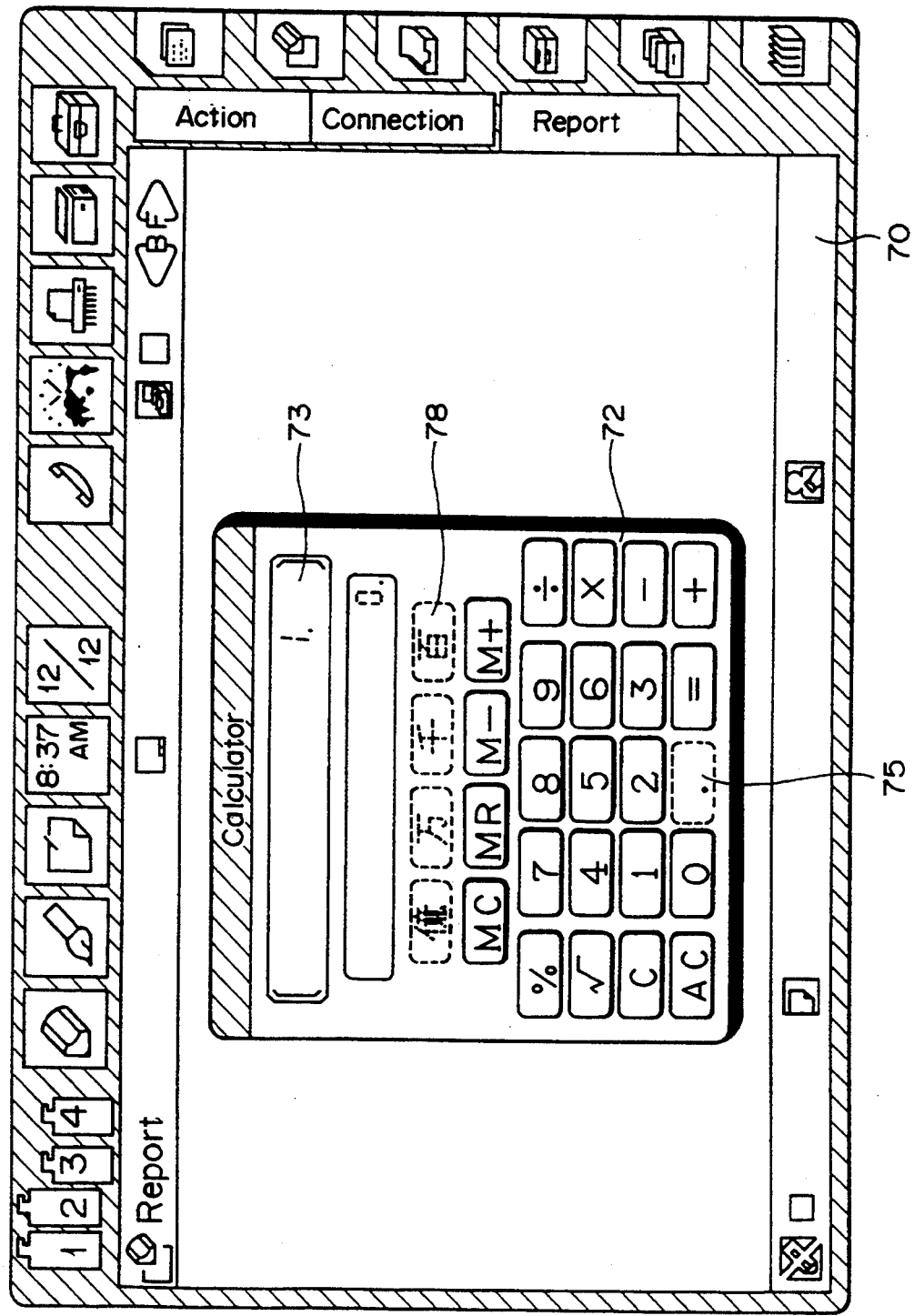
Figure 2F:
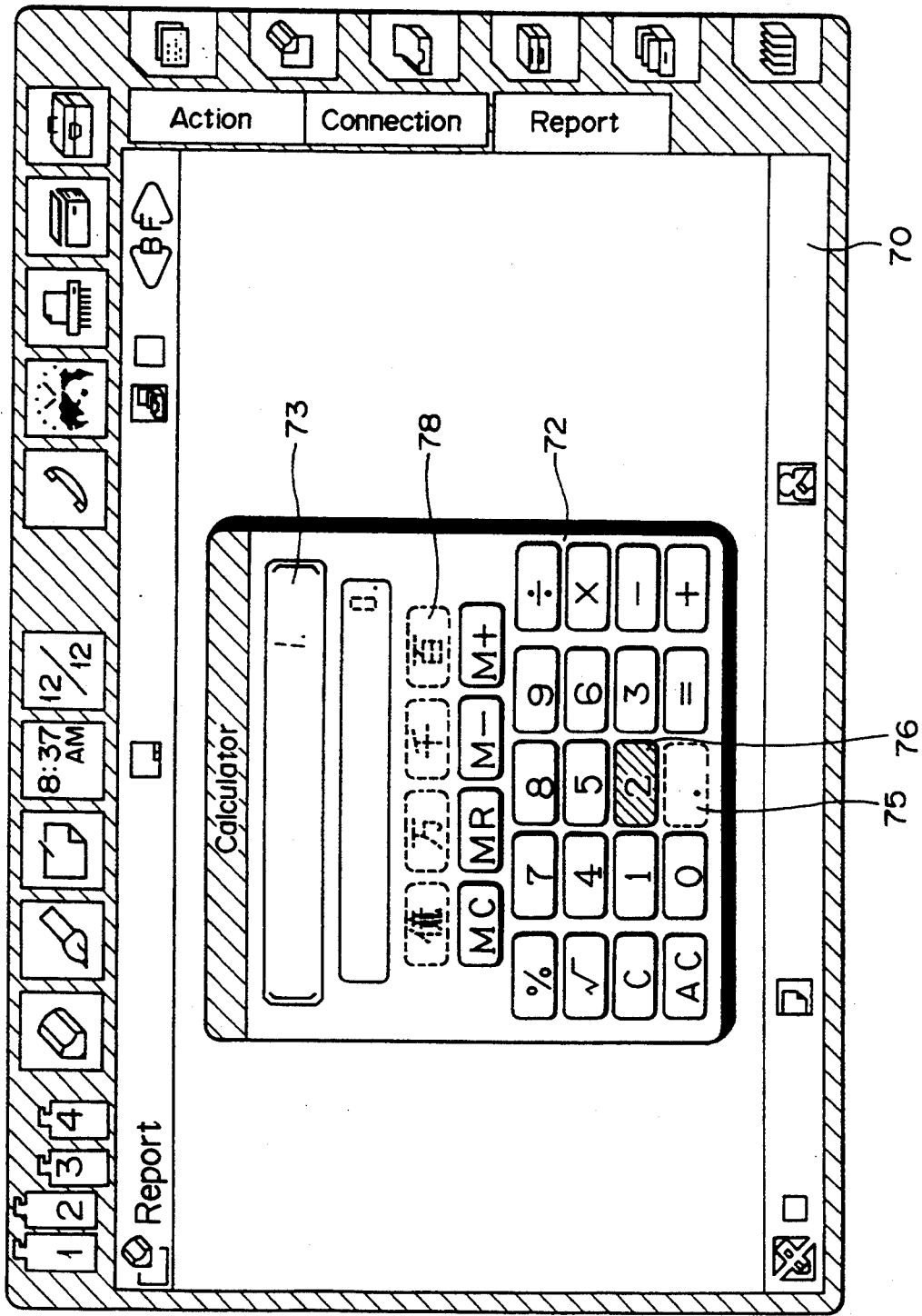

If the decimal point key 75 is depressed at step ST5 as shown by a hatched portion in FIG. 2D, then the processing proceeds to the next decision step ST8. In decision step ST8, it is determined whether the decimal point 75 can be selected. If a NO is output at step ST8, then the processing returns to step ST4 in which the CPU 21 awaits the input of data. If the decimal point key 75 may be depressed as shown in FIG. 2C, then the processing proceeds to step ST9, whereat numerical values are input. For example, if the decimal point key 75 is depressed as shown by the hatched portion in FIG. 2D, the CPU 21 proceeds to the next step ST10, whereat the decimal point key 75 and the figure determining key pad 78 are represented by a half tone mesh as shown in FIG. 2E. Thus, the decimal point key 75 is set in selection disabled condition and this selection disabled condition is visually displayed. The display on the display portion 73 at that time still remain as [1. ].

Figure 2G:
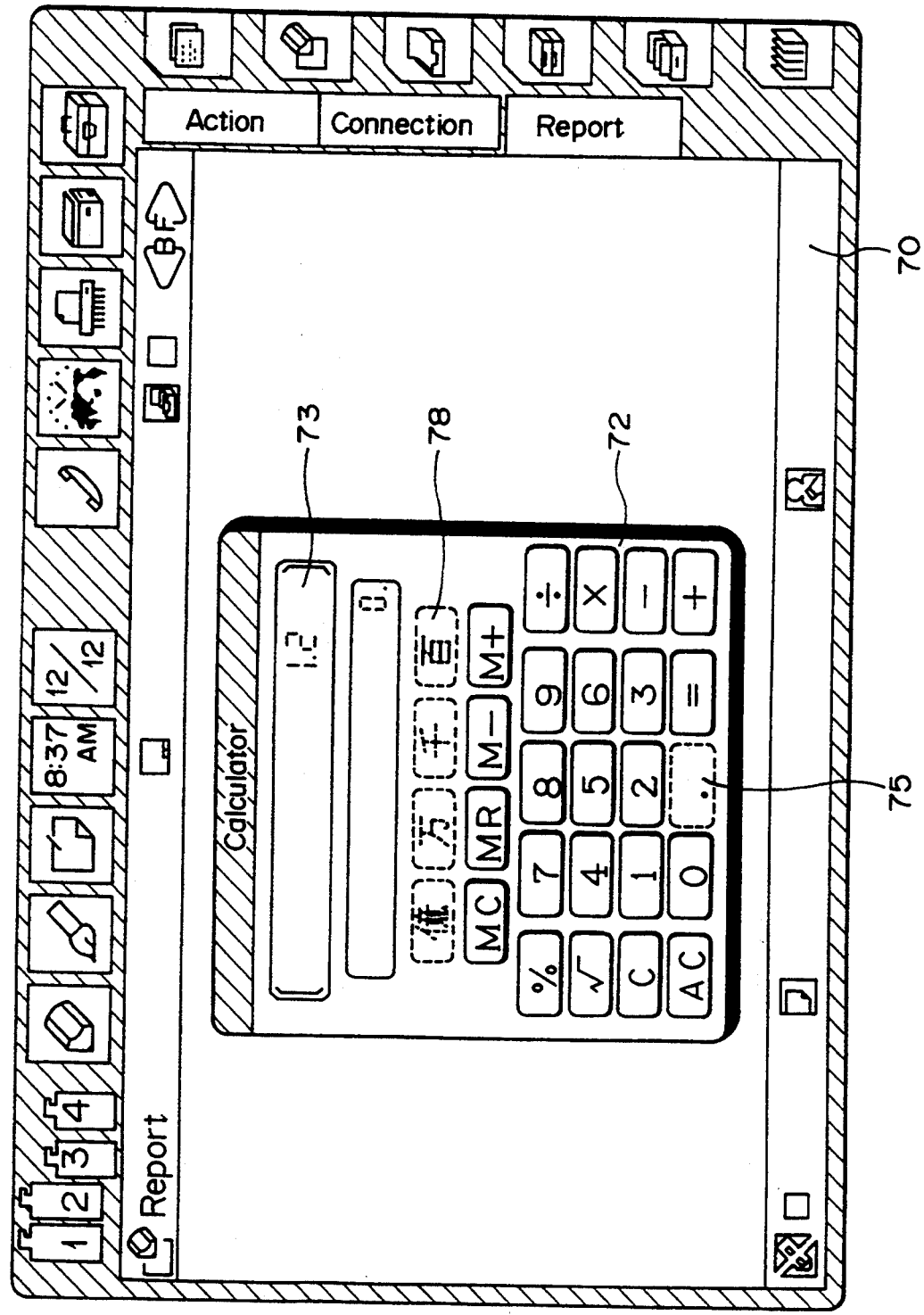
Figure 2H:
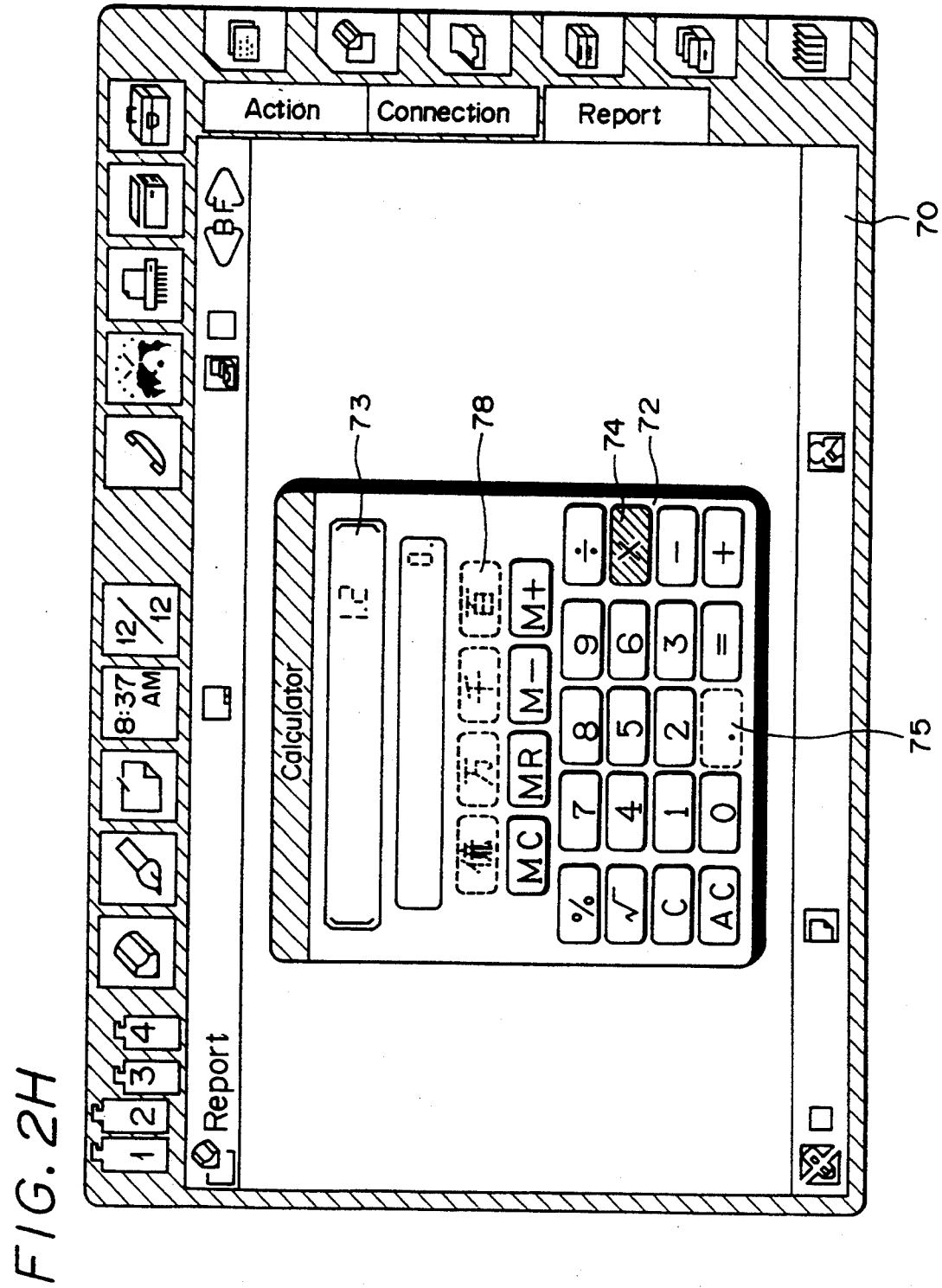
Figure 21:
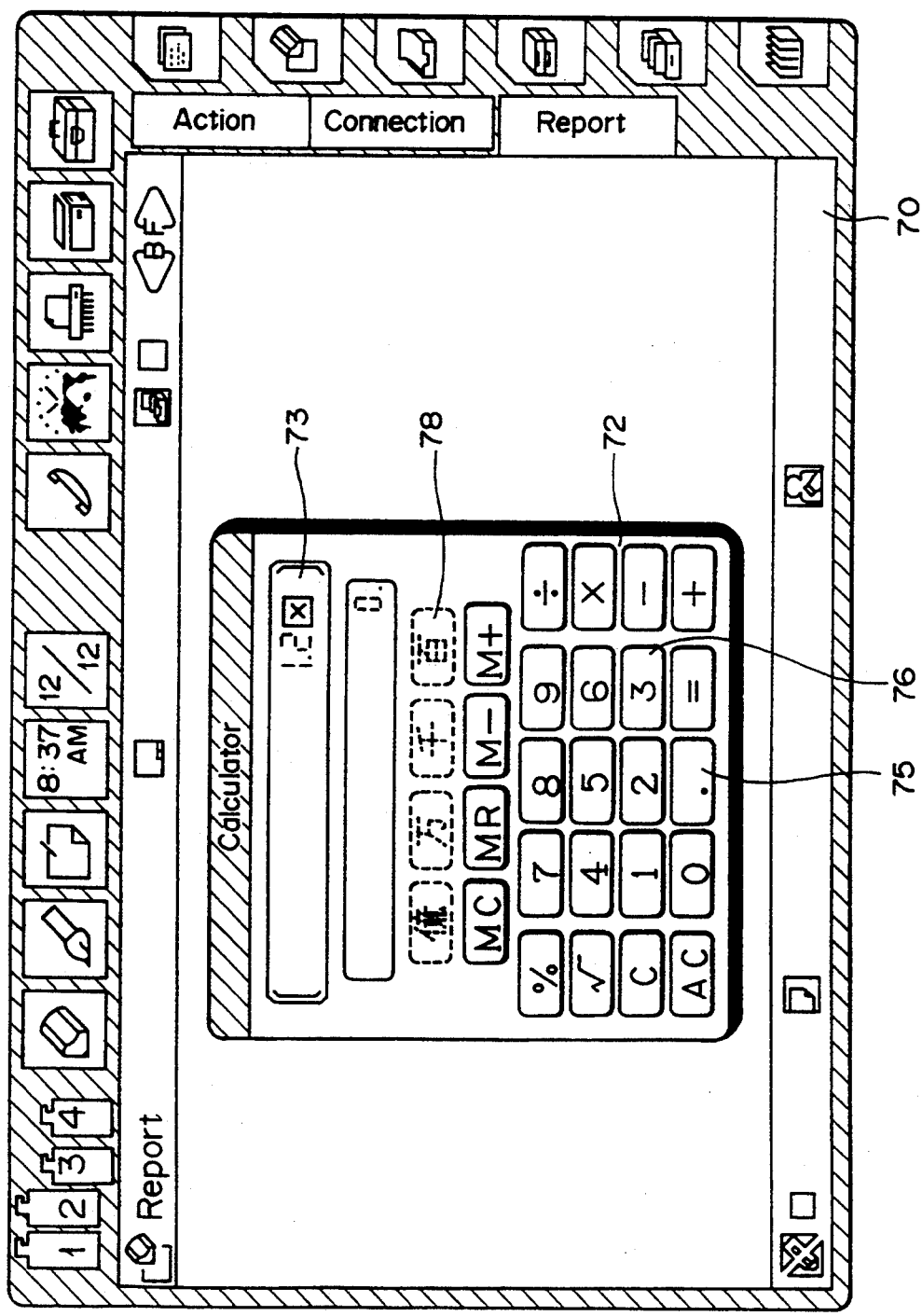

Then, the processing returns to the decision step ST6. If the key in the key pad of 0 to 9 is depressed, for example, if numeral key "2" is depressed as shown by a hatched area in FIG. 2F, at that time, as shown in FIG. 2G, the user can visually understood that the decimal point key 75 and the figure determining key pad 78 are both in the selection disabled condition, thus the user being protected from operating these keys inadvertently. It is needless to say that the abovementioned operations enable the display portion 73 to display [1.2] as shown in FIG. 2G. If [x] key in the operation key pad 74 is depressed as shown by a hatched area in FIG. 2H, this [x] key is not involved in the numeral key pad 76 of 0 to 9 so that the CPU 21 proceeds to the next decision step ST11, whereat it is determined whether or not the decimal point key 75 can be selected. If a YES is output at step ST11, then the processing proceeds to the next step ST12 whereat the decimal point key 75 can be selected and also [1.2 x] is displayed on the display portion 73 as shown in FIG. 21. Such decision at step ST11 is made possible by depressing other keys than the numerical keys 76.

Figure 2K:
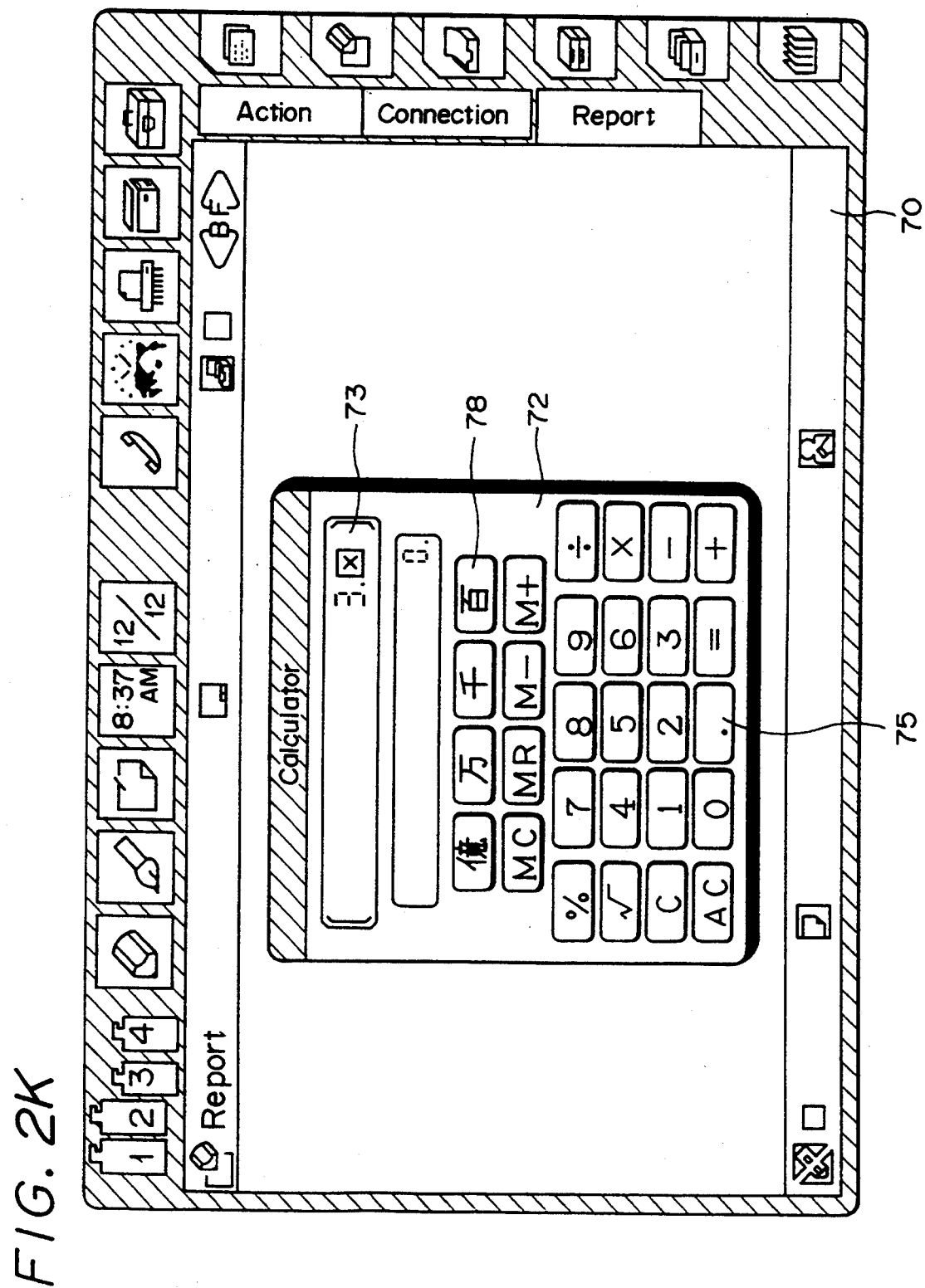
Figure 2J:
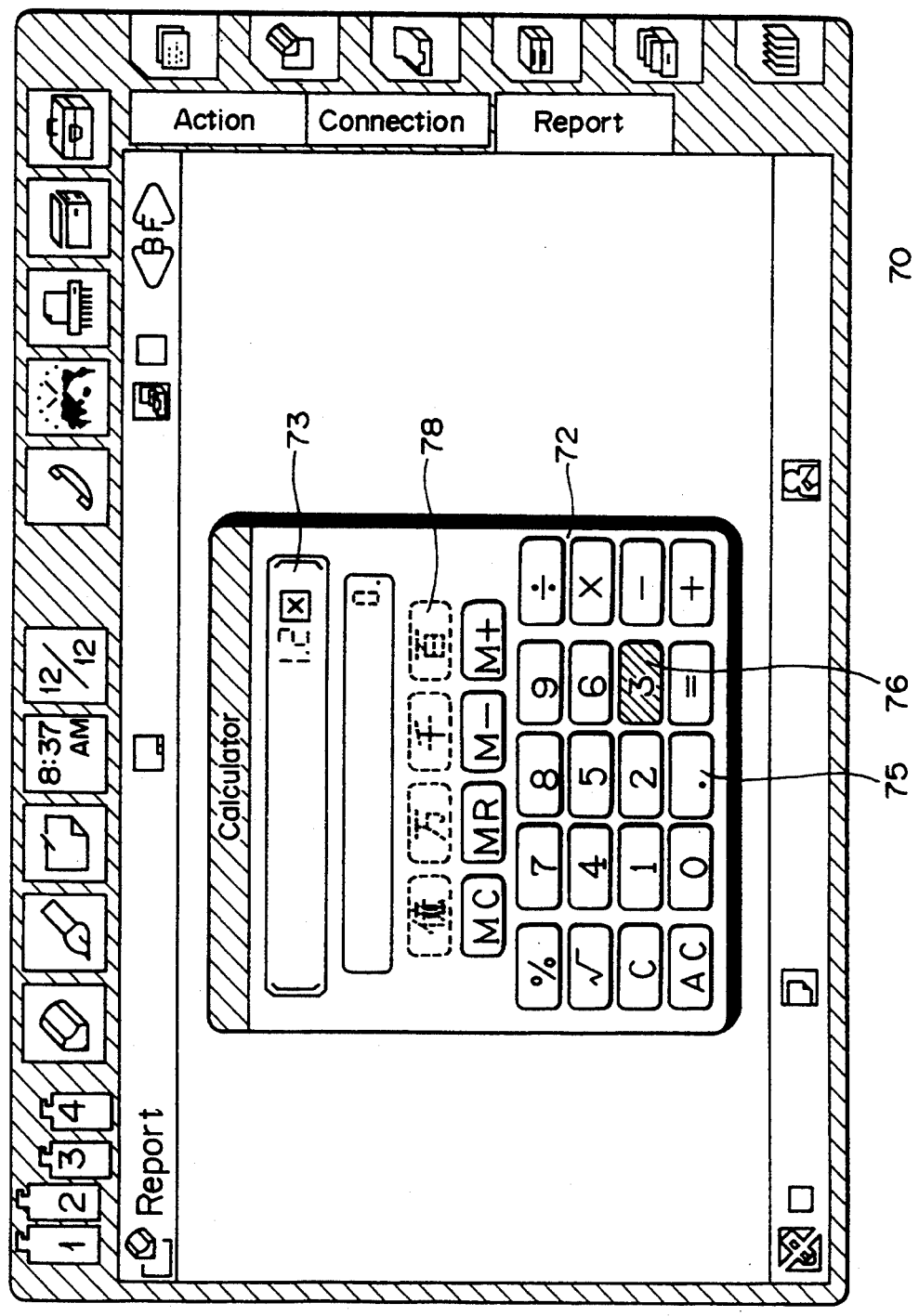

If a number [3] to be multiplied is input to [1.2] substituted as described above as shown by a hatched area in FIG. 2J, the decimal point key 75 can be selected as shown in FIG. 2J. If the decimal point key 75 is depressed, then as shown in FIG. 2K, [3. x ] is displayed on the display portion 73, and all keys involving the figure determining key pad 78 can be selected.

Since the calculating apparatus of the present invention is operated as described above, the decimal point key 75 and the figure determining key pad 78 are disabled when the depression of the decimal point key 75 is useless, thus making it possible to prevent the user from mis-operating the key.

While the calculating apparatus is described in which the calculator window in displayed on the display screen, the present invention is not limited thereto and may be applied to a calculating apparatus in which depression keys are displayed on a liquid crystal panel. In this case, by illuminating the depression key portion, it becomes possible for the user to know the selection disabled condition of the key. Further, if the present invention is applied to a calculating apparatus which employs a standard mechanical depression key or the like, the depression key is set in the locked condition that can not be depressed and whether the depression key can be selected or not can be displayed by turning on or off lights, thereby informing of the user that the decimal point key was already depressed twice in a series of depression of numeral keys.

According to the calculating apparatus of the present invention, if the decimal point key is depressed once, such decimal point key is in the selection disabled condition while a series of numerals keys are depressed, which condition can be visually confirmed by the user. Therefore, the user can be protected from mis-operating the key.

Having described a preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claim.

I claim as my invention:

1. A portable calculating apparatus, comprising:
   display means for displaying image information;,
   a tablet for inputting coordinate signals;
   a pen for pointing on said tablet so as to supply information about said coordinate signals;
   a video RAM for storing a video image for display on said display means;
   a ROM for storing a calculating image for display on said display means;
   a control circuit for controlling said calculating image;
   said calculating image has an input information display portion, numeral keys, operation keys, and a decimal point key;
   when a series of numerical values are input by pointing said pen on said numeral keys, the control circuit controls said calculating image so that an initial visible image of each key is changed to an operated image when the key is just pointed by said pen, then after said pen is released from said key, the operated image is recovered to said initial visible image, and after that;
   an initial visible image of said decimal point key changes to said operated image when the key is just pointed by said pen, then after said pen is released from the key, the operated image is changed to a disable visible image and the decimal point key is controlled so that said decimal point is in a selection disable condition after said decimal point key is operated once; and thereafter, following operation of a key which does not input a numeral value, said decimal point key is controlled by said control circuit so as to change to a selection enable condition and said disable image of said decimal point key is recovered to the initial image.

* * * * *